United States Patent [19]
Nishikawa et al.

[11] Patent Number: 5,563,956
[45] Date of Patent: Oct. 8, 1996

[54] APPARATUS FOR FILING DATA USED FOR IDENTIFYING AN INDIVIDUAL AND FOR EXECUTING BI-LEVEL PRINTING AND MULTI-GRADATION PRINTING ON THE BASIS OF THE DATA

[75] Inventors: Masaji Nishikawa, Hachioji; Junichi Ishibashi, Iruma; Masashi Asano, Tokyo, all of Japan

[73] Assignee: Olympus Optical Co., LTD., Tokyo, Japan

[21] Appl. No.: 439,708

[22] Filed: May 12, 1995

Related U.S. Application Data

[63] Continuation of Ser. No. 751,978, Aug. 29, 1991, abandoned.

[30] Foreign Application Priority Data

Aug. 30, 1990 [JP] Japan .................... 2-228665

[51] Int. Cl.$^6$ .................................................. G06K 9/00
[52] U.S. Cl. ........................... 382/118; 382/270; 382/305
[58] Field of Search .................................. 358/455, 456, 358/457; 395/112, 115; 382/118, 270, 276, 305; H04N 1/40

[56] References Cited

U.S. PATENT DOCUMENTS

| | | | |
|---|---|---|---|
| 4,276,570 | 6/1981 | Burson et al. | 358/903 |
| 4,707,801 | 11/1987 | Barnes et al. | 364/900 |
| 4,797,943 | 1/1989 | Murayama et al. | 382/54 |
| 4,924,301 | 5/1990 | Surbrook | 358/75 |
| 4,926,268 | 5/1990 | Kawamura et al. | 358/458 |
| 4,975,960 | 12/1990 | Petajan | 381/43 |
| 5,099,258 | 3/1992 | Hirayama | 346/76 PH |
| 5,134,666 | 7/1992 | Imao et al. | 382/9 |
| 5,140,674 | 8/1992 | Anderson et al. | 395/111 |
| 5,187,594 | 2/1993 | Deutsch et al. | 358/455 |
| 5,199,081 | 3/1993 | Saito et al. | 382/2 |
| 5,200,285 | 4/1993 | Carrish | 430/45 |
| 5,222,157 | 6/1993 | Yoneda et al. | 382/41 |
| 5,227,873 | 7/1993 | Chiba et al. | 358/80 |

FOREIGN PATENT DOCUMENTS

| | | |
|---|---|---|
| 63-316275 | 12/1988 | Japan. |
| WO8605610 | 9/1986 | WIPO ........................... 382/41 |

OTHER PUBLICATIONS

"Examples Of System Composition", catalogue by Fuji Photo Film Co., Ltd. Oct. 1990.

*Primary Examiner*—Leo Boudreau
*Assistant Examiner*—Andrew W. Johns
*Attorney, Agent, or Firm*—Frishauf, Holtz, Goodman, Langer & Chick

[57] ABSTRACT

The invention discloses an apparatus for filing and printing data available for individual identification, which characterisitically comprises the following, an image data base memory which stores plural pieces of facial photographic data available for individual identification in the form of multi-gradational image data, a means for delivering data read out from the image data base memory in the form of printable data available for a multi-gradational video printer capable of modulating gray level per picture element, a means for generating pseudo multi-gradational bilevel data by arithmetically processing image data read out of the image data base memory by applying pseudo multi-gray scale modification, and a bilevel recording printer which receives the generated pseudo multi-gradational bilevel data and than prints the pseudo multi-gradational bilevel image.

7 Claims, 6 Drawing Sheets

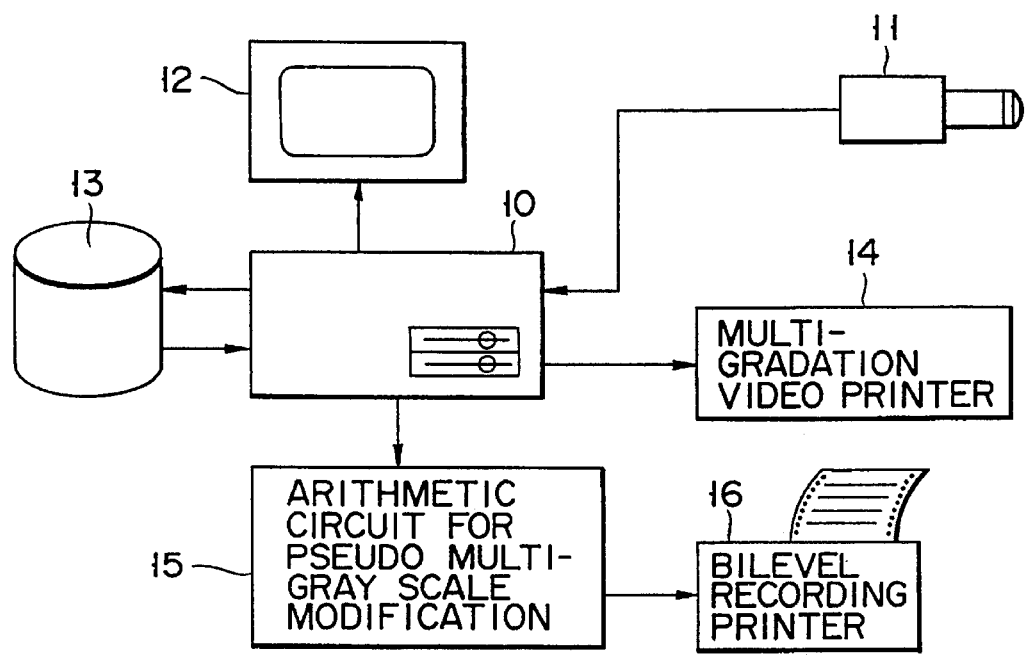
F I G. 1
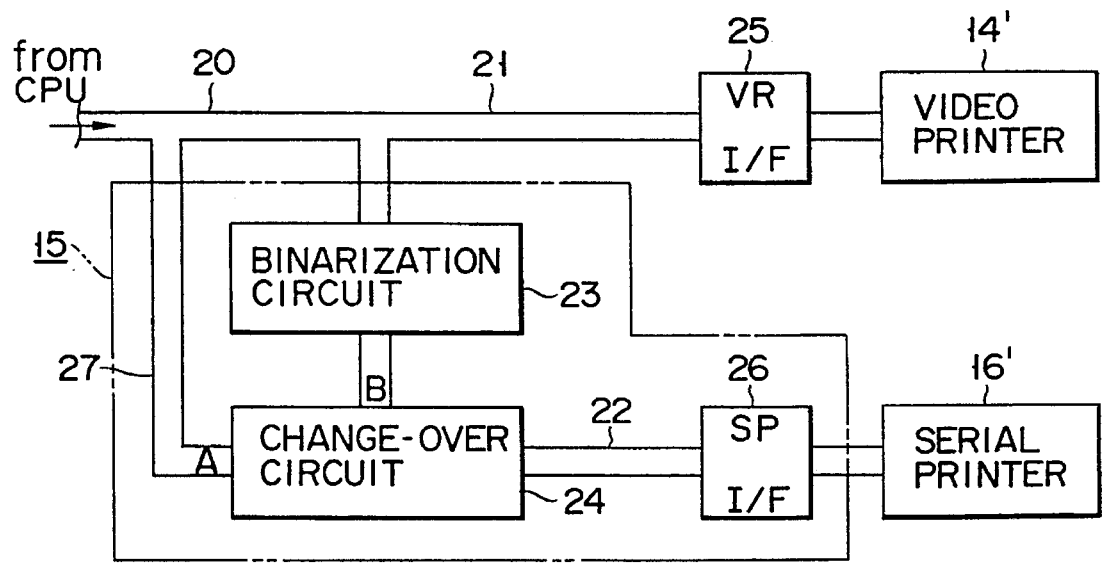
F I G. 2

APPARATUS FOR FILING DATA USED FOR IDENTIFYING AN INDIVIDUAL AND FOR EXECUTING BI-LEVEL PRINTING AND MULTI-GRADATION PRINTING ON THE BASIS OF THE DATA

This application is a Continuation of application Ser. No. 07/751,978, filed Aug. 29, 1991, now abandoned.

BACKGROUND OF THE INVENTION

1. Field of the Invention

The present invention relates to an apparatus which is available for filing and printing a variety of data including facial photographic data.

2. Description of the Related Art

Conventional photography using a silver chloride solution and also instant photography have been used to provide a, facial photograph of an individual printed on a printing paper. The photograph is conventionally fixed to a card or other such means with identification of the individual can be made. However, when facial photographic data is merely printed on the printing paper, data is solely available from the printed photograph. As a result, it has long been quite difficult for any conventional art to file the facial photographic data on a non-visual medium, to correct the data, or to precisely reproduce the facial photographic data. In consequence, actual utility of the facial photographic data has been confined to an extremely narrow range of uses. In order to make use of the facial photographic data printed on a printed paper for the purpose of identifying an individual, the facial photograph must be bonded to an identification card with an adhesive agent. As a result, the bonded photograph may accidentally be stripped off from the card.

To solve the problems mentioned above, a variety of approaches have been developed. For instance, one approach converts the facial photographic data into electric signals and then prints out the facial photographic data as required. Typically, image data contains an amount of data which is greater than needed for characters and numerals. Therefore, there are a number of drawbacks connected with processing the facial photographic data in the form of electric signals to form a part of the identification data used to identify an individual. However, as a result of significant development of image processing apparatuses in recent years, such drawbacks have been reduced.

In the ID card production apparatus disclosed in the Japanese Patent Laid-Open Publication No. 63-316275 of 1987, for example, the technique of optionally printing out the facial photographic data in the form of electric signal is disclosed. The ID card production apparatus disclosed by the above Japanese Patent Laid-Open Publication No. 63-316275 of 1987 executes those processes described below.

Image signals of the target body, such as the individual person of interest, which are picked up by a color TV camera are converted into multi-gradational digital signals by an analogue-to-digital converter. The digital signals are stored in a frame memory. Next, an image signal processing circuit composed of a lookup table memory and an adder executes arithmetic operations needed for removing dullness from chrominance components caused by improper spectral absorbing factors of chromatic material available for full-color video printers. Using an operating unit composed of a keyboard unit and a memory unit, the ID card production apparatus cited above electrically generates a graphic image and a character-image, which are then synthesized and edited in combination with image signals of the target body by the video signal generator composed of the lookup table memory and a video RAM. In this way, an image is made available for producing an ID card, and then the complete image is printed out of the full-color video printer.

Conventionally, there is a known data base system which files such facial photographic data in order to retain the facial photographic data of individual members associated with a variety of business enterprises or schools. As is typically designated under the title of "examples of system composition" appearing in the catalogue published by Fuji Film Co., Ltd., of Japan, the data base system cited above is well known. This data base system introduces video signals from a video camera via an image processor, then the video signals are displayed on a TV monitor, and, simultaneously, the data base system writes the image data in the data file unit. The stored image data can optionally be printed out by applying a video printer.

Both of the approaches cited above produces facial photographic data in the form of a full-color image, and enables the filing or printing thereof. To achieve this, both of these systems needs to operate a video printer capable of printing a full-color image, and yet, needs to use specific high-quality printing papers.

In some case, printable identification data mainly contains character data with a negligible amount of facial photographic data. In this case, it is desired that character data be printed by applying a conventional monochromatic printer capable of recording signals according to ON-OFF bilevel recording dots. To implement the printing operation, facial photographic data must be filed in the form of binary-coded image data for the reason described below. Normally, any facial photographic data filed in the form of one signal format cannot be printed out with such a printer which prints facial photographic data only in the form of another signal format.

As mentioned above, considering the need for optionally printing out the facial photographic data, any conventional system using facial photographic data stored in the data base must file individual facial photographic data in accordance with the image signal format corresponding to the printer which is used. More particularly, when printing out the designated facial photographic data using a multi-gradational video printer, the facial photographic data signals must be filed in the form of a multi-gradational image signal. On the other hand, when printing out the designated facial photographic data using either a monochromatic binary serial dot printer or a page printer, the conventional system needs to preliminary file the designated facial photographic data in the form of bilevel image data complete with pseudo multi-gray scale modification. These requirements limit the effective use of facial photographic data. Furthermore, since any conventional system needs to always file such facial photographic data in the form of a variety of image signals, any of those conventional systems must include a large-capacity external memory device. This, in turn, results in a complex structure and enlarged structural dimensions.

SUMMARY OF THE INVENTION

Therefore, the object of the invention is to provide a novel apparatus which is available for filing and printing individual-identification data. The apparatus embodied by the invention can provide the following features.

The apparatus can optionally and selectively execute printing operations using a multi-gradational video printer and a bilevel recording printer against the preliminary filed identical facial photographic data.

The apparatus can unify the kind of image data format to be filed in the data base, and thus, the apparatus can simplify data input/output operation, data correction, and data maintenance.

The apparatus can provide the data base memory with relatively less capacity than that of any conventional memory, and yet, it has simple structure and compact size.

In order to achieve the above objects, the present invention adopts the following means (1) to (5).

(1) An image data base memory which is capable of storing a plurality of facial photographic data available for individual identification in the form of multi-gradational image data containing gradational data per picture element;

- a means for delivering the image data read out from the image data base memory in the form of printable data available for a multi-gradational video printer which is capable of modulating gray level per picture element;
- a means for generating pseudo multi-gradational bilevel data by arithmetically executing pseudo multi-gray scale modification against those image data delivered from the image data base memory; and
- a bilevel recording printer which receives the pseudo multi-gradational bilevel data generated by above means and then prints pseudo multi-gradational bilevel image on a printing paper.

(2) The following means is added to the means (1).

- a character/numerical data base memory which is provided in addition to the image data base memory and stores individual data available for identification in the form of character/numerical data; and
- a bilevel image editing memory board which synthesizes and edits character/numerical data output from the character/numerical data base memory and pseudo multi-gradational bilevel data including facial photographic data which is delivered from the image data base memory and treated with pseudo multi-gray scale modification on a page of data file; wherein the bilevel recording printer prints out the bilevel image data synthesized and edited by the bilevel image editing memory board.

(3) The following means is added to the means (1).

An image editing memory board is provided between the image data base memory and a multi-gradational video printer.

The apparatus embodied by the invention synthesizes and edits the multi-gradational facial photographic data and other patterns and character data needed for producing an ID card on the image editing memory board so that the synthesized and edited multi-gradational data can be printed out by the multi-gradational video printer.

(4) A video pickup means which photographs the target human body and generates multi-gradational video signals enough to fill up a plurality of data files;

- an image data base which stores those multi-gradational video signals enough to fill up a plurality of data files delivered from said video pickup means in the forms of multi-gradational image data containing gradational data per picture element;
- an image editing memory board which synthesizes and edits the multi-gradational image data stored in the image data base and other patterns and character data needed for producing an ID card;
- a video printer which prints image by way of modulating image gray level per picture element in correspondence with the image data delivered from the image editing memory board;
- a means for generating pseudo multi-gradational bilevel data including facial photographic data by arithmetically treating the multi-gradational image data from the image data base with pseudo multi-gray scale modification;
- a data base which stores individual data in the form of character and numerical data;
- a bilevel image editing memory board which synthesizes and edits those character and numerical data stored in the data base and those pseudo multi-gradational bilevel data treated with pseudo multi-gray scale modification on a page of data file; and
- a bilevel recording printer which executes ON-OFF bilevel recording operations in correspondence with the pseudo multi-gradational bilevel data delivered from the bilevel image editing memory board.

Based on the multi-gradational image data output from the image data base memory, the apparatus embodied by the invention executes the printing of an ID card, and simultaneously, executes the printing of bilevel data including the bilevel facial photographic data for individual identification.

(5) An NTSC-format video camera which transmits the NTSC composite video signals;

- a signal conversion means which converts the NTSC composite video signals from the NTSC-format video camera into R (red), G (green), and B (blue) digital image signals;
- a filing unit which stores those digitized RGB image signals converted by said signal conversion means enough to fill up a plurality of pages of ID data file;
- an image editing memory board which synthesizes and edits those digitized RGB image signals and other patterns and character is needed for producing an ID card;
- a video printer which receives image data synthesized and edited by the image editing memory board and then prints multi-gradational full-color image;
- a signal generating means which generates luminance signal Y from those digitized RGB image signals stored in the file unit by an amount corresponding to a plurality of pages of ID data file;
- a means for encoding the luminance signal Y generated by said signal generating means into bilevel data by arithmetically treating it with pseudo multi-gray scale modification;
- a data base which stores individual data in the form of character and numerical data;
- a bilevel image editing memory board which synthesizes and edits the character and numerical stored in the data base memory together with the pseudo multi-gradational bilevel data containing facial photographic data already treated with the pseudo multi-gray scale modification process on a page of ID data file; and
- a bilevel recording printer which executes ON-OFF bilevel recording operations in correspondence with the bilevel data output from the bilevel image editing memory board.

Since the means (1) through (5) are adopted, basically, the following effects are obtained.

Since the multi-gradational video printer and bilevel recording printer have different recording system respectively, there is a difference in the form of acceptable print data signals. Despite this basic difference, arithmetic means provided for the apparatus embodied by the present invention modifies the pseudo multi-gradation of the multi-gradational image data read out from the image data base memory. As a result, these image data are converted into pseudo multi-gradational bilevel data on a real-time basis, and then, the converted pseudo multi-gradational bilevel data can optionally be printed out by operating a bilevel recording printer. Naturally, multi-gradation image data read out from the image data base memory can be printed out by multi-gradational video printer with a gray level being modulated for each picture element.

In this way, using image data filed in the image data base memory in the form of multi-gradational image data, the apparatus embodied by the invention can optionally and selectively execute the multi-gradational printing with the multi-gradational video printer, and executes the pseudo multi-gradational printing with the bilevel recording printer. As a result, the apparatus can unify the kind of image data format to be filed in the data base, and thus, the apparatus can simplify the data input/output operation, data correction, and maintenance operation. Since the kind of image data format filed in the data base can be unified, the apparatus can conveniently provide the data base memory with relatively modest capacity, thus effectively materializing compact size and simplified structure of the whole system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 through 7 respectively show the first embodiment of the present invention, wherein;

FIG. 1 is a schematic overall block diagram showing the apparatus for filing and printing identification data;

FIG. 2 is a concrete block diagram showing functional units of personal computer and the arithmetic circuit available for executing pseudo multi-gray scale modification process;

FIG. 3 is a concrete block diagram showing an example of the binarization circuit;

FIGS. 4 through 6 respectively show width of luster data delivered to printers;

FIG. 7 is another concrete block diagram showing the binarization circuit;

FIGS. 10 and 11 respectively show the fourth embodiment of the present invention, in which, FIG. 10 is an overall block diagram showing the main components disposed in correspondence with those which are shown in FIG. 1, and in which FIG. 11 is a block diagram of the main components disposed in correspondence with those which are shown in FIG. 2.

Figure 3:
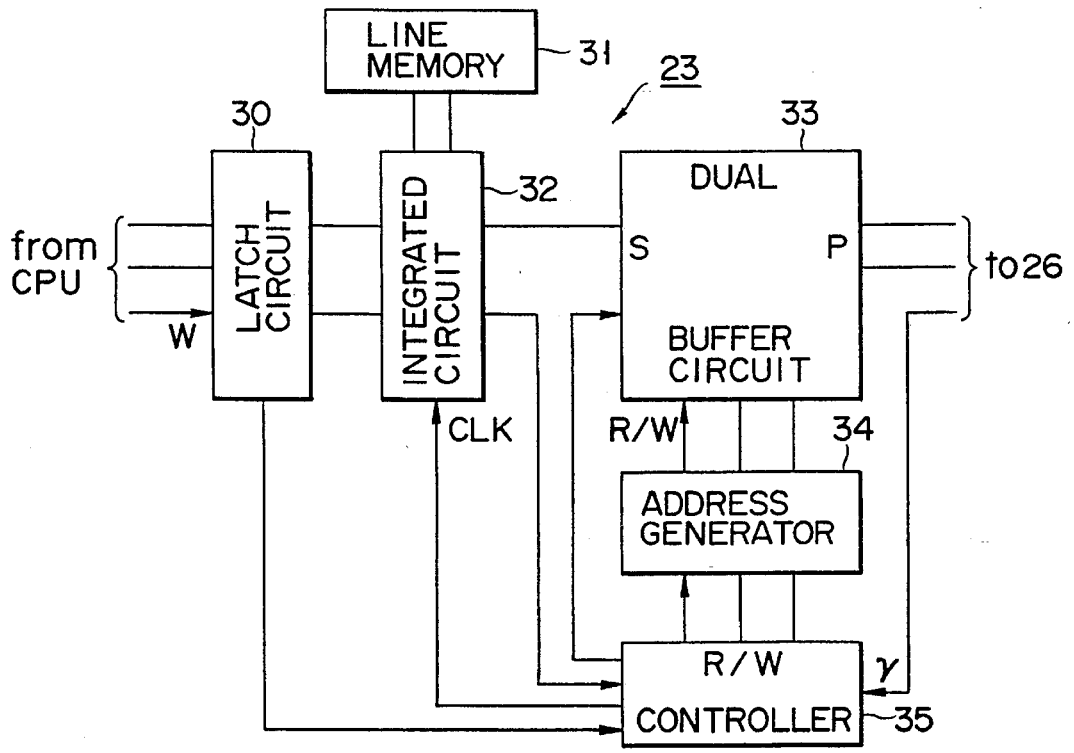

DETAILED DESCRIPTION OF THE PREFERRED EMBODIMENTS (First Embodiment)

The first embodiment of the present invention will be described below with reference to FIGS. 1 to 7.

FIG. 1 is a schematic overall block diagram showing the apparatus for filing and printing identification data according to the first embodiment of the invention. As shown in FIG. 1, the apparatus comprises the following; a personal computer 10, a video camera 11, a TV monitor set 12, a data base memory 13, a multi-gradational video printer 14, an arithmetic circuit 15 for pseudo multi-gray scale modification, and a bilevel recording printer 16.

The video camera 11 picks up facial photographic data available for identifying an individual ("individual identification"). Normally, the video camera 11 picks up an image signal of the target body in the form of the NTSC-format composite video signal or the analogue RGB signals. In place of this video camera, the invention can also introduce a still camera or a scanner for picking up an image from facial photographic data preliminary printed on a print paper.

Initially, the image signal picked up by the video camera 11 is converted into signals which are suited for filing by an image processing board (not shown) built in the personal computer 10. Such signals are, for example, a multi-gradational digital RGB image signal or a compressed image signal. Next, the converted image signal containing information of multi-gradational image gray level per picture element is delivered to the data base memory 13, which then stores the image signal in the form of multiple images. Simultaneously, the state of the stored image is displayed on the TV monitor set 12 for visual confirmation.

The data base memory 13 contains a predetermined capacity suited for storing a large amount of multi-gradational image data. The apparatus embodied by the invention can optionally select any memory device from hard disc memory device, optical disc memory device, optical/magnetic disc memory device, or magnetic-tape memory device, for example.

The multi-gradational video printer 14 can properly modulate gray level per picture element. The apparatus embodied by the invention may select the multi-gradational printer 14 from formats which include the following: a system which prints out image data on a silver-chloride coated printing paper, a system which prints image data by applying thermal sublimation and transfer; a system which prints image data by applying the multi-gradational ink-jet unit; and a system which prints image data on a thermosensitive color developing paper, for example.

The arithmetic circuit 15 for pseudo multi-gray scale modification generates pseudo multi-gradational bilevel data. Detail of the operation of the arithmetic circuit 15 is described later on.

The bilevel recording printer 16 describes the recording condition based on the presence or absence of the recording dots. Practically, either a serial printer executing a printing operation based on line unit or a page printer executing a printing operation based on page unit can be made available for the bilevel recording printer 16.

The serial printer includes a wire-dot printer, a thermal printer, and an ink-jet printer, for example. The page printer includes those electronic photographic printers like the laser printer and the LED printer for example.

FIG. 2 is a block diagram showing those functional components of the personal computer 10 and the arithmetic circuit 15 which generate pseudo multi-gradational bilevel data.

The reference numerals 20, 21, 22, and 27 respectively show data bus lines. The reference numeral 23 shows a binarization circuit built in the arithmetic circuit 15. The reference numeral 24 shows a changeover circuit, 25 a video printer interface VP I/F, and 26 a serial printer interface SP I/F. The reference numeral 14' shows a video printer as an example of the multi-gradational video printer 14, the reference numeral 16' shows a serial printer as the an example of the bilevel recording printer 16.

The binarization circuit 23 is substantially composed of a binarization means based on the "dither method" applying a ROM, or another binarization means based on an error diffusing method.

The change-over circuit 24 comprises an input port A which directly receives data from the data bus 20 of the personal computer 10 via data bus 27 and another input port B which receives bilevel data from the binarization circuit 23. The change-over circuit 24 then selectively receives data by selectively switching between the input ports A or B, and then outputs the received data to the serial-printer interface 26.

The video printer interface 25 coordinates and connects the data bus 21 of the personal computer 10 to the video printer 14'. Normally, a majority of video printers 14' incorporate a standard parallel interface like SCSI or GP-IB for example, and thus, any of these video printers 14' is provided with an LSI which solely controls the standard parallel interface. Because of this, the LSI may be made available to serve as the video printer interface 25.

The serial printer interface 26 coordinates and connects the data bus 22 to the serial printer 16'. Normally, the serial printer interface 26 is composed of a standard interface like the Centronics I/F and RS232C for example.

Before starting to operate the video printer 14' to print out image data, the CPU in the personal computer 10 outputs a command signal to the control IC of the video printer interface 25. Most command signals are based on the standard of a general bus like GP-IB or SCSI. This in turn indicates that sequentially delivered data are output to the video printer 14'.

On receipt of the command signal from the CPU, the video printer interface 25 receives image and character data by way of data bus 21, and then outputs the data to the video printer 14'.

For delivering these image and character data to the serial printer 16', the change-over circuit 24 is switched to the input port A. Next, a command signal from the CPU is delivered to the serial printer 16' via the serial printer interface 26. This in turn indicates that image signals are sequentially delivered to the serial printer 16'. Since most serial printers 16' are available merely for printing out characters in many cases, if a certain data were solely delivered to the serial printer 16', then the serial printer 16' may incorrectly identify that a character code is received. To prevent this, the CPU delivers the command signal to the serial printer 16'.

Only when the serial printer 16' receives the command signal designating the image data is the change-over circuit 24 switched to the input port B. In this way, the image data from the data base memory 13 is delivered to the binarization circuit 23, which then converts the image data into binary codes. The binary-coded image signal is eventually delivered to the serial printer 16' via the change-over circuit 24 and the serial printer interface 26.

FIG. 3 is a block diagram showing an example of the binarization circuit 23. Latch circuit 30 latches data. An integrated circuit 32 shown in FIG. 3 may be composed of a commercially available IC circuit to convert image signals into binary signals by modifying a pseudo multi-gray scale through diffusion of error component. Line memory 31 plays an important role to diffuse error.

A buffer circuit 33 is solely made available for externally delivering data signals. The buffer circuit 33 is composed of a ROM and a RAM called a "dual-port RAM" having a serial port and parallel ports. Functionally, the buffer circuit 33 absorbs time-base deviation between the binarization operation performed by the binarization circuit 23 and the printing operation performed by the serial printer 16'. In addition, the buffer circuit 33 executes a modifying process described below.

Concretely, the integrated circuit 32 outputs perfect luster data. Nevertheless, the serial printer 16' demands data which is a luster data containing the width of the head unit of the printer. To offset this difference, the buffer circuit 33 executes a modifying process by providing the luster data with the predetermined width.

An address generator 34 provides the buffer circuit 33 with reading addresses. A read-write controller 35 receives a demand signal "r" from the serial printer 16' for delivery of data, and then controls operations of the address generator 34 and the integrated circuit 32. The read-write controller 35 delivers clock signal CLK to the integrated circuit 32 to activate the binarization process. The content of the read-write controller 35 is programmed by such an IC circuit called the "programmable logic device (PLD) and gate array".

Next, the functional operation of the binarization circuit 23 shown in FIG. 3 is described below.

When the read-write controller 35 detects that the latch circuit 30 has latched data, the read-write circuit 35 delivers clock signal CLK simultaneously to the integrated circuit 32. Next, the integrated circuit 32 receives data from the latch circuit 30, and then executes the predetermined arithmetic operations to write error components in the line memory 31. Simultaneously, the latch circuit 30 informs the read-write controller 35 that the modification process has been terminated. On receipt of this information, the read-write controller 35 activates the integrated circuit 32 to write data in the buffer circuit 33. As mentioned earlier, the buffer circuit 33 has a dual-port RAM incorporating a serial port and parallel ports, and then using these ports, the buffer circuit 33 internally executes the serial-parallel conversion. The serial-parallel conversion may also be executed by applying a conventional serial-parallel converter.

In response to the demand signal "r" from the serial printer 16' for delivery of data, the read-write controller 35 activates operation of the address generator 34. On receipt of an address signal from the address generator 34, the buffer circuit 33 delivers the internally stored bilevel image data to the serial printer 16' via the serial printer interface 26.

Figure 4:
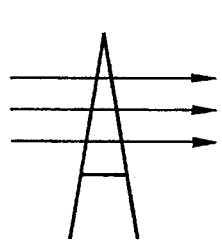
Figure 5:
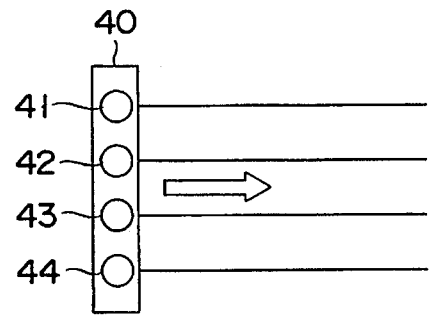
Figure 6:
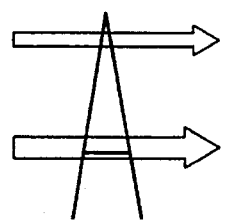

Next, as shown in FIG. 4, when operating a page printer, those luster data are sequentially delivered after being scanned every main scan line. On the other hand, as shown in FIG. 5, the printing head 40 of the serial printer 16' has a plurality of head pins 41 to 44 which are aligned in the direction orthogonally intersecting the printing direction. Because of this arrangement, the outgoing data must be converted into those luster data D1, D2, . . . Dn (not shown) each containing a specific width in the sub-scanning direction as shown in FIG. 6. Thus, the buffer 33 shown in FIG. 3 must contain specific capacity which is adequate to store those luster data having sizes more than that which is demanded by the serial printer 16', where the needed size substantially corresponds to the number of head pins of the printing heads in many cases.

Figure 7:
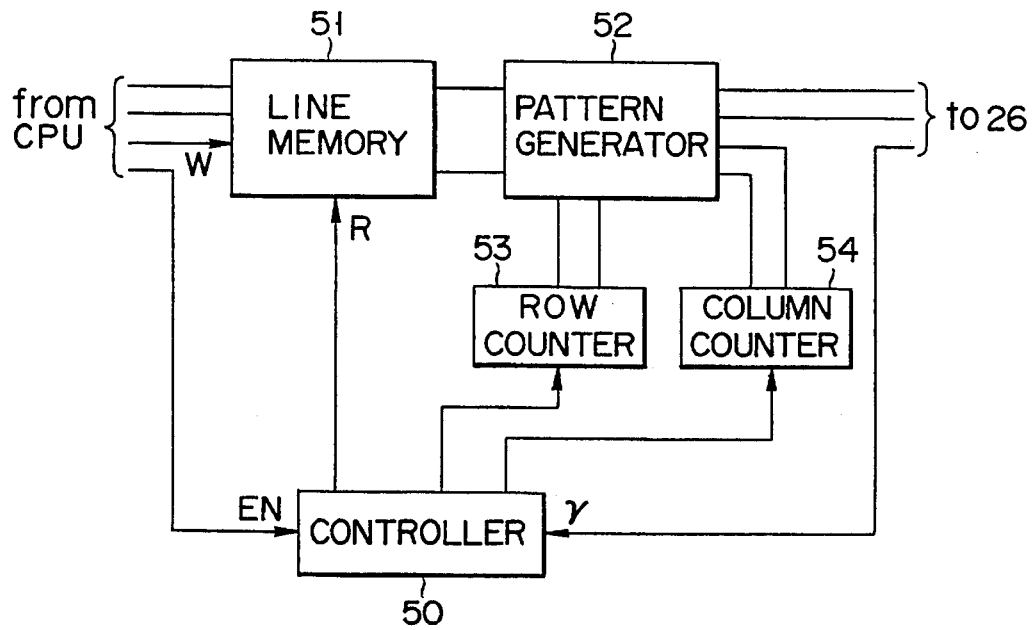

FIG. 7 shows another example of the binarization circuit 23, which specifically introduces the "dither method". A controller 50 built in the binarization circuit 23 is substantially composed of the "programmable logic device" mentioned earlier. The controller 50 controls operations of a line memory 51, a row counter 53, and a column counter 54, respectively. The line memory 51 stores data corresponding to a single line. In place of the line memory 51, the internal memory unit of the personal computer 10 may also be made available. A pattern generator 52 is composed of a ROM and a RAM including the "dither" pattern. The row counter 53 receives signals from the controller 50 and then generates row addresses. Likewise, the column counter 54 generates column addresses on receipt of signals from the controller 50.

Next, functional operation of the binarization circuit 23 shown in FIG. 7 is described below.

First, the CPU of the personal computer 10 adjusts the size of data. As is well known, the dither method expresses pseudo multi-gradation based on the distribution of the density of the recording dots. Normally, in order to express gradation based on the ON-OFF binary function of the recording dots, a matrix should be made available. Since each gradational data is converted into a wide variety of ON-OFF dot combinations, image size expands. For example, assume that the data base stores 100×100 dots of n-bit gradational data. In order to precisely express the gradational data, the system needs to use $100 \times 100 \times 2^n$ dots of data. Nevertheless, this in turn results in image size which is too large. To replace this method, the technique called "dither method" is introduced, which permits the combination of the recordable dot number and the gradational expression to optionally be arranged. The size-adjusted data is then written in the line memory 51. After completing the image writing process, the write-completed signal is delivered to the controller 50.

Upon receipt of the write-completed signal and in response to the demand signal "r" from the serial printer 16' via the interface 26 for delivery of data, the controller 50 generates three kinds of signals including the signal R for reading data from the line memory 51, the signal for controlling the row counter 53, and the other signal for controlling the column counter 54. Finally, the controller 50 delivers those data from the line memory 51 to the pattern generator 52, and simultaneously, the controller 50 transmits the dither data to the serial printer 16' via the interface 26.

(Second Embodiment)

Figure 8:
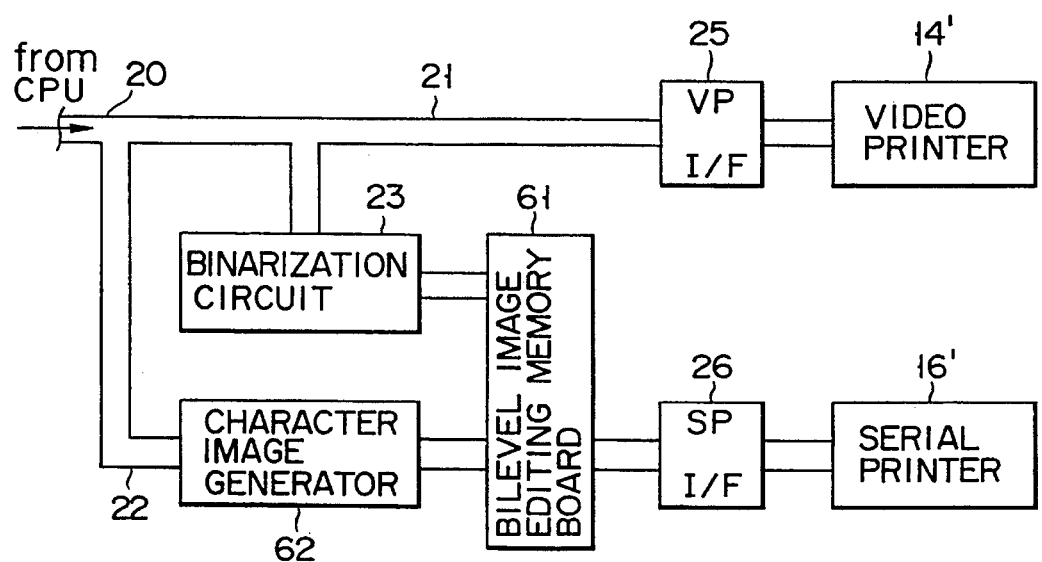
FIG. 8 is the concrete block diagram showing the main components of the apparatus according to the second embodiment of the present invention, where those main components are respectively disposed in correspondence with those which are shown in FIG. 2.

FIG. 8 is a block diagram showing main components of the apparatus for filing and printing identification data according to the second embodiment of the present invention.

The apparatus according to the second embodiment of the present invention is further provided with an individual data base memory, i.e. a bilevel image editing memory board 61, and a character image generator 62 in addition to those components provided for the apparatus of the first embodiment. It is assumed that the individual data base memory is additionally built in the data base memory 13 shown in FIG. 1.

As shown in FIG. 8, the apparatus comprises a bilevel image editing memory board 61 in conjunction with a character-image generator 62. The produced bilevel image data is transferred to the serial printer 16' via the serial printer interface 26. Although not shown in FIG. 8, image position is properly controlled in order that characters and facial photographic data can be stored in the bilevel image editing memory board 61 to compose an integrated image available for identification data. The serial printer interface 26 transfers the image-data controlling code to the serial printer 16'.

(Third Embodiment)

Figure 9:
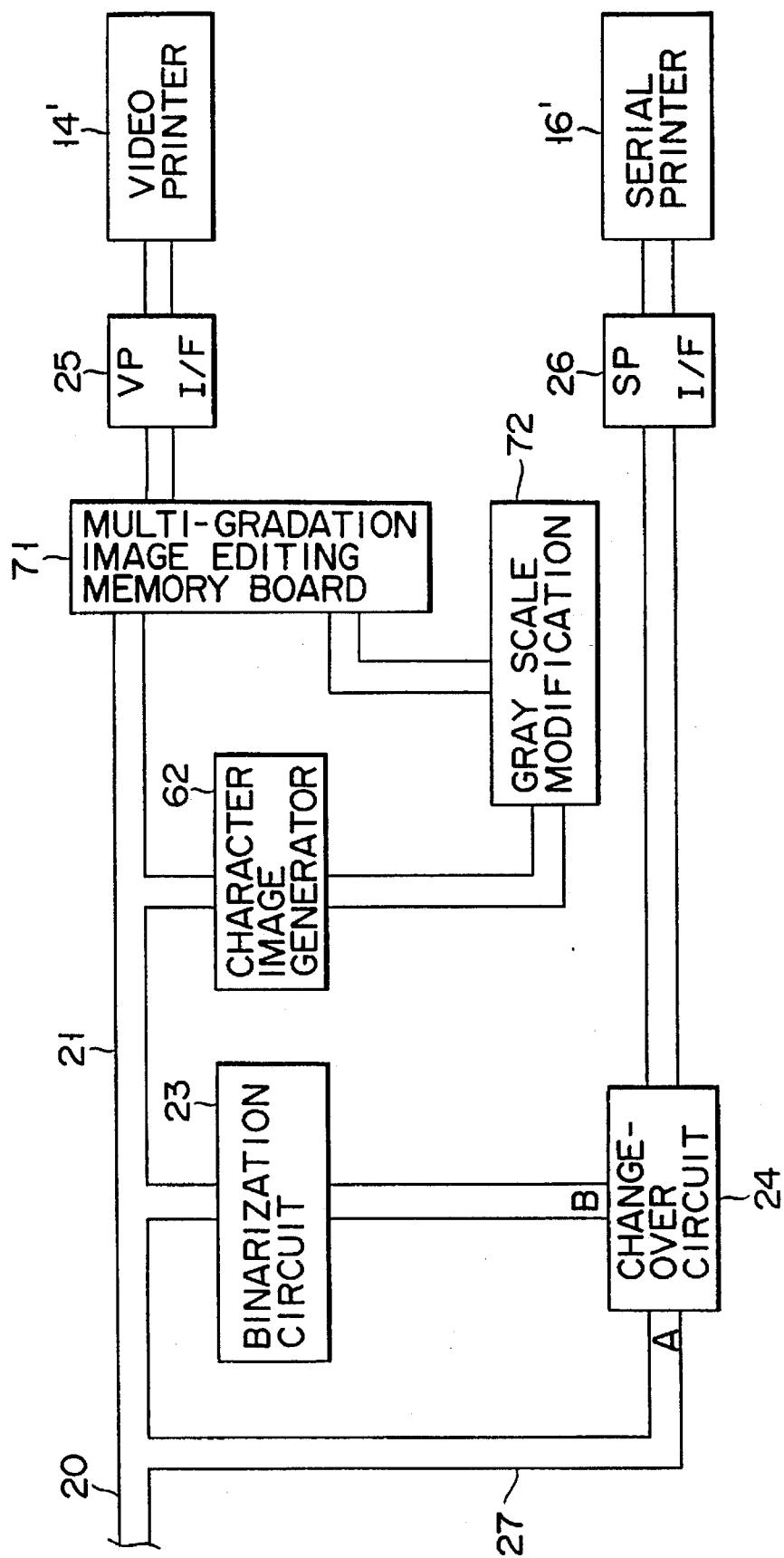
FIG. 9 is the concrete block diagram showing the main components of the apparatus according to the third embodiment of the present invention, where those main components are respectively disposed in correspondence with those which are shown in FIG. 2.

FIG. 9 is a block diagram showing an apparatus according to a third embodiment of the present invention. In order that the video printer 14' can also print character data, the apparatus comprises the multi-gradational image editing memory board 71 which is capable of editing multi-gradational image. In this case, in order that character image can monochromatically be expressed, and yet, in order that the bilevel data can be converted into black and white data, or in order that the colored character can properly be printed, and furthermore, in order to convert the bilevel data into specific data designating a variety of depth of respective colors including intermediate tones, a gradational converter 72 is connected to the output terminal of character image generator 62. It is assumed that the pattern image data needed for producing an ID card is stored in the data base memory 13 shown in FIG. 1. Using the facial image data, pattern image data available for composing the ID card and character image data are synthesized into a set of multi-gradational image data. After transmitting the synthesized multi-gradational image data to the video printer 14, the apparatus can print out the character-added identification information image.

Although not shown in FIG. 9, in this case, image position is precisely controlled so that the facial image data, pattern image data available for composing the ID card, and character image data can be stored in the multi-gradational image editing memory 71.

(Fourth Embodiment)

Figure 10:
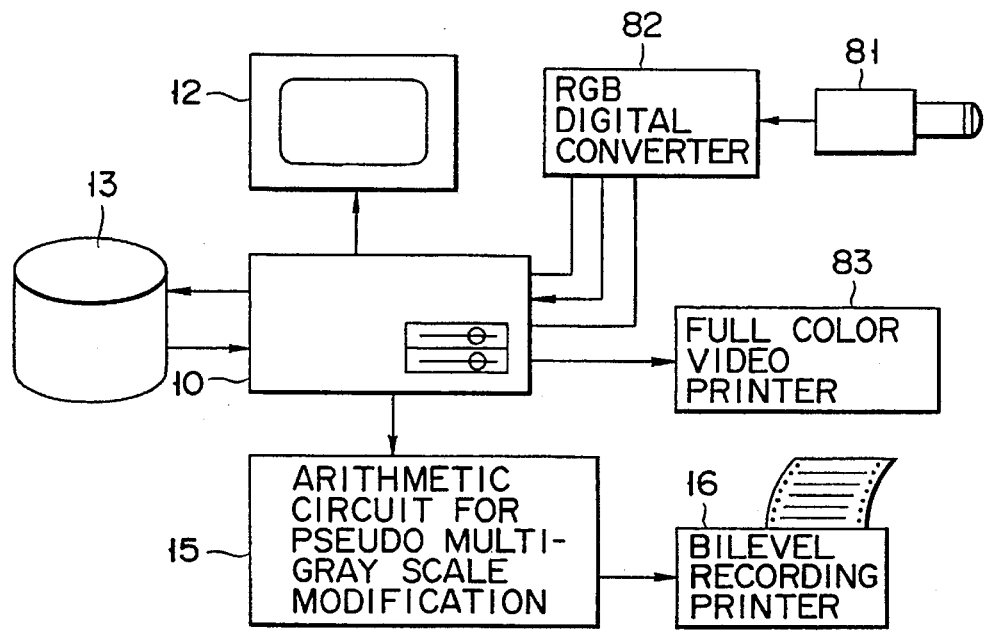
Figure 11:
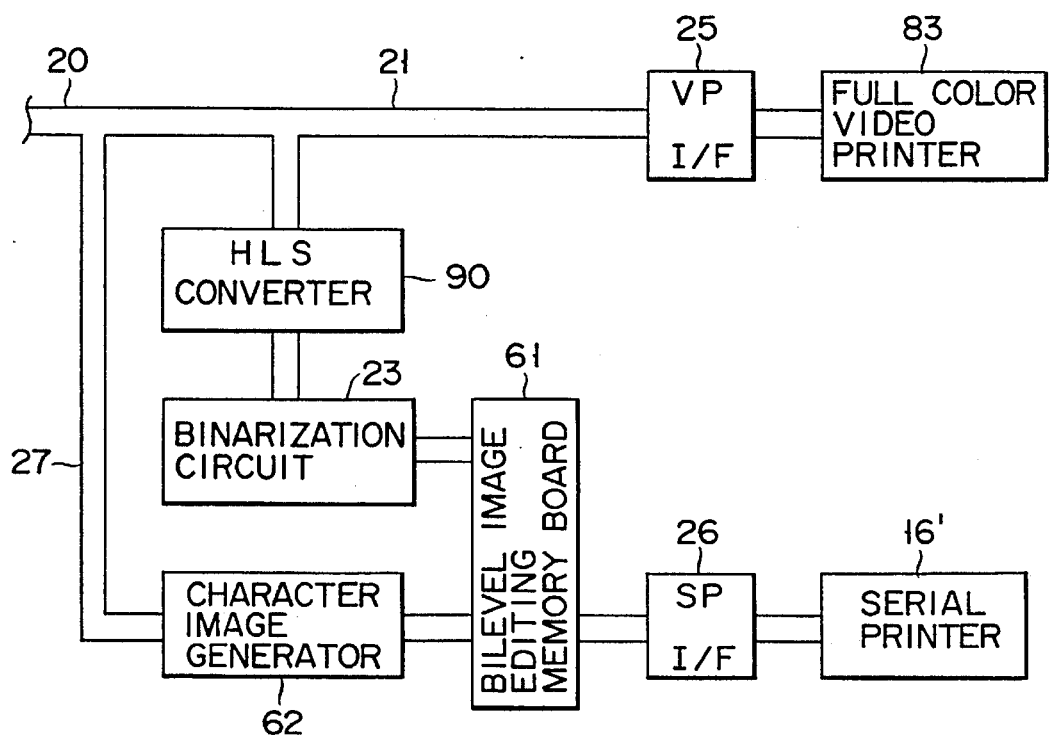

FIGS. 10 and 11 respectively show a fourth embodiment of the present invention.

As shown in FIG. 10, the apparatus introduces an image pickup means comprising an NTSC composite video camera 81 and an RGB digital converter 82 connected to each other.

Data base memory 13 shown in FIG. 10 stores all those data thus far produced. A full-color video printer 83 prints out multi-gradational full-color image data.

As shown in FIG. 11, the apparatus comprises an HLS converter 90 (where H designates hue, L luminance, and S designates chroma saturation) capable of converting the digitized RGB data into luminance information image. The HLS converter is added to the input terminal of the binarization circuit 23 shown in FIG. 8.

Applying those components shown in FIGS. 10 and 11, the NTSC composite video signals delivered from the NTSC composite video camera 81 are converted into digital RGB data signals by the RGB digital converter 82, and then these digital RGB data signals are stored in the data base memory 13. The stored RGB digital data signals are then read out of the data base memory 13, and finally, as was done for the third embodiment, the full-color identification data image composed of facial image and character image is printed by a full-color video printer 83.

On the other hand, the RGB color image data is converted into monochromatic image data by the HLS converter 90, and then further converted into bilevel image data by the binarization circuit 23. Next, the bilevel image data is synthesized with the character image data by the bilevel image editing memory board 61, and then the synthesized image is transferred to the serial printer 16' via the serial printer interface 26. Finally, as was done for the second embodiment, a bilevel image is printed out by the serial printer 16'.

(Fifth Embodiment)

Figure 12:
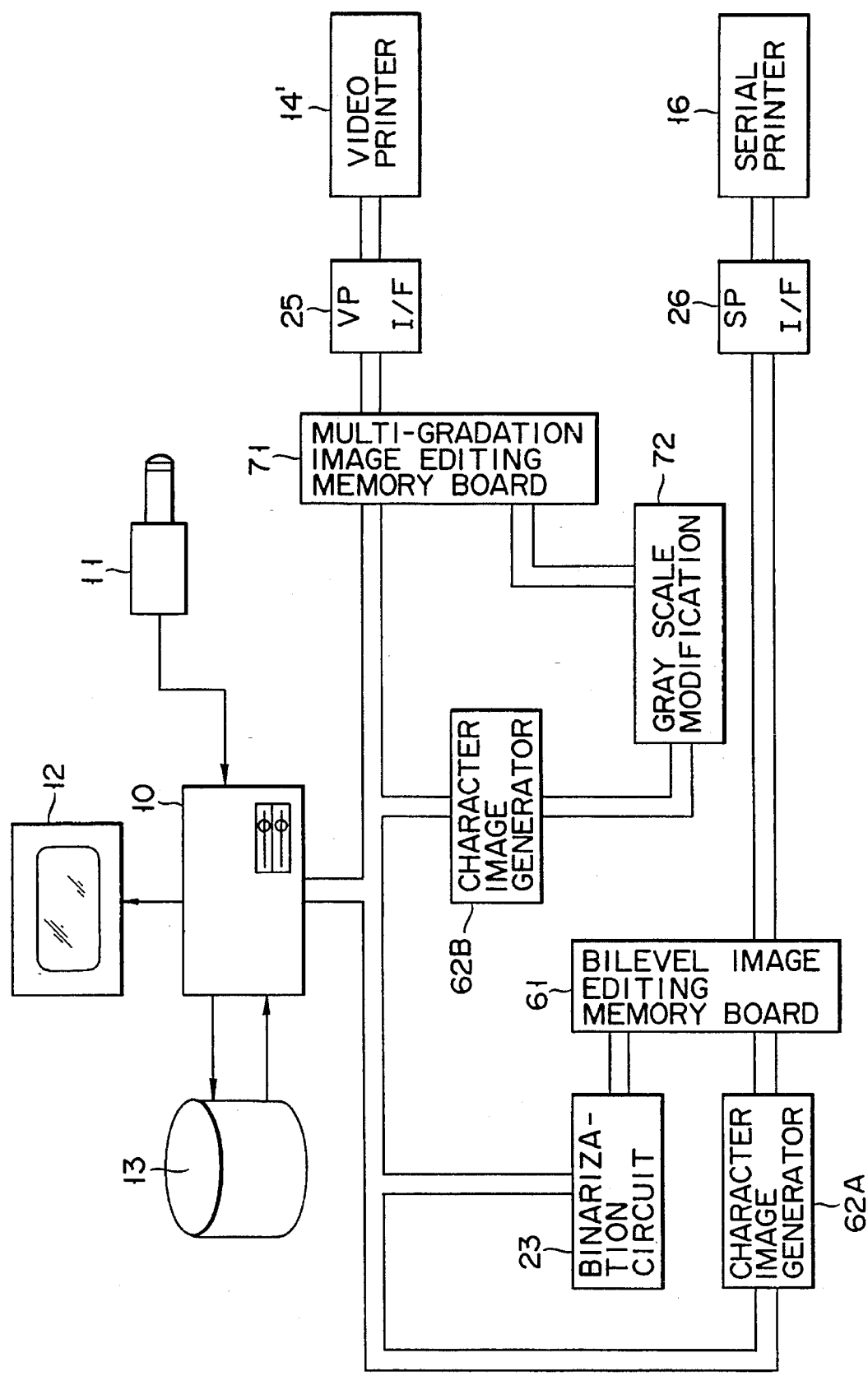
FIG. 12 is a concrete block diagram showing the apparatus according to the fifth embodiment of the present invention.

FIG. 12 shows a fifth embodiment of the present invention. As shown in FIG. 12, the system of the fifth embodiment uses a video camera 11. Video signals containing an image of the target human body taken by the video camera is delivered to the personal computer 10, which then converts those video signals into multi-gradational image data containing gradational data per picture element. Next, the multi-gradational image data containing facial photographic available for identification are stored in the image data base memory 13 in the form of individual data base. It is assumed that the image data base memory 13 preliminary stores pattern image data like a "logo" needed for preparing the ID card. Those multi-gradational image/character data containing the facial photographic data available for identification are respectively displayed on a TV monitor set 12.

As was done for the second embodiment shown in FIG. 8, the apparatus according to the fifth embodiment of the present invention is provided with the following; a binarization circuit 23 which converts image data into bilevel data, a character generator 62A, a bilevel image editing memory board 61, a serial printer interface 26, and a serial printer 16' which prints a bilevel image. Furthermore, like the third embodiment shown in FIG. 9, the apparatus according to the fifth embodiment is additionally provided with the following; a character image generator 62B; a multi-gray scale modifier 72; a multi-gradational image editing memory board 71 which synthesizes and edits facial image, pattern image, and character image; a video printer interface 25; and a video printer 14' which prints out a multi-gradational image by modulating the gray level per picture element.

When operating the apparatus according to the fifth embodiment, the bilevel image editing memory board 61 internally synthesizes character image and facial photographic data, and then controls position of the synthesized image. Next, a control code ruling the image data is transferred to the controller of the serial printer 16' via the serial printer interface 26. Then, the bilevel image data is delivered to the serial printer 16' via the serial printer interface 26.

Simultaneously, the multi-gradational image editing memory board 71 internally synthesizes a facial photographic image, a pattern image available for composing an ID card, and the character image, and then controls position of the synthesized image so that the synthesized image can properly be printed out in the form of the identification data image. Finally, the synthesized multi-gradational image data is delivered to the serial printer 14' via the video printer interface 25.

In this way, using the synthesized multi-gradational image data, the serial printer 14' executes the printing of an ID card, and at the same time, using the bilevel image data containing the binary-coded facial photographic data, the serial printer 16' executes the printing of the bilevel image data.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for filing individual-identification data and for selectively executing one of bi-level printing and multi-gradation printing on the basis of the individual-identification data, said apparatus comprising:

image data base memory means for storing image data representing a plurality of facial images, said image data being stored in said image data base memory means as multi-gradation image data which contains gradation data per picture element;

monitor means for monitoring an image state of the facial images represented by the image data stored in said image data base memory means;

multi-gradation printer means producing a plurality of individual recording dots for printing the image data read out from said image data base memory means, each of said individual recording dots having multiple levels of gradation, with a gray level corresponding to each said individual recording dot being modulated;

multi-gradation print data supplying means for supplying the multi-gradation image data stored in said image data base memory means as print data to said multi-gradation printer means;

bi-level printer means for printing a bi-level image;

arithmetic circuit means for executing pseudo multi-gradation conversion with respect to the multi-gradation image data read out from said image data base memory means, to thereby produce pseudo multi-gradation bi-level data; and bi-level print data supplying means for supplying at least the pseudo multi-gradation bi-level data produced by said arithmetic circuit means as print data to said bi-level printer means.

2. The apparatus of claim 1, wherein said arithmetic circuit means includes:

binary data producing circuit means for converting said multi-gradation image data into binary image data; and change-over circuit means for, in a case where data to be sent to said bi-level printer means is character data, supplying the character data directly to said bi-level print data supplying means, and for, in a case where data to be sent to said bi-level printer means is image data, supplying the image data to the bi-level print data supplying means after converting it into binary data by means of the binary data producing circuit means.

3. The apparatus of claim 1, further comprising:

character image generator means for generating the character data; and binary image editing memory means for editing both binary data supplied from said character image generator means and binary image data supplied from said binary data producing circuit means.

4. The apparatus of claim 2, further comprising:

character image generator means for generating the character data;

gradation converter means for converting the character data generated by said character image generator means into multi-gradation image data; and multi-gradation image editing memory means for editing both the multi-gradation image data supplied from said image data base memory means and the multi-gradation image data supplied from said gradation converter means.

5. An apparatus for filing individual-identification data and for selectively executing one of bi-level printing and multi-gradation printing on the basis of the individual-identification data, said apparatus comprising:

a video camera which produces NTSC composite video signals;

signal converting means for converting the NTSC composite video signals from said video camera into RGB (red, green, and blue) digital image signals;

a filing unit having means for storing the RGB digital image signals converted by said signal converting means and corresponding to a plurality of images;

monitor means for monitoring an image state of images represented by the RGB digital image signals stored in said filing unit;

video printer means producing a plurality of individual elements for printing a full-color multi-gradation image on the basis of RGB digital image signals read out from said filing unit, each of said individual elements having multiple levels of gradation;

signal generating means for generating a luminance signal Y from the RGB digital image signals stored in said filing unit and corresponding to a plurality of images;

binary data producing circuit means for producing binary image data by applying a pseudo multi-gradation conversion based on an arithmetic operation to the luminance signal Y generated by said signal generating means; and bi-level printer means for printing at least the bi-level image data produced by said binary data producing circuit means.

6. The apparatus of claim 5, further comprising:

character image generator means for generating character image data; and binary image editing memory means for editing both bi-level image data supplied from said binary data producing circuit means and the character image data generated by said character image generator means.

7. The apparatus of claim 6, further comprising:

another character image generator means for generating character image data;

gradation converting means for converting the character image data generated by said other character image generator means into multi-gradation image data; and multi-gradation image editing memory means for editing both RGB digital image signals read out from said filing unit and the multi-gradation image data generated by said gradation converting means.

* * * * *